United States Patent [19]

Burnett et al.

[11] Patent Number: 4,463,576
[45] Date of Patent: Aug. 7, 1984

[54] SOLID STATE CLUTCH CYCLER WITH CHARGE PROTECTION

[75] Inventors: Dale E. Burnett, Lebanon; Mervin R. Butts, West Milton; Paul E. Trissel, Dayton, all of Ohio

[73] Assignee: General Motors Corporation, Detroit, Mich.

[21] Appl. No.: 424,464

[22] Filed: Sep. 27, 1982

Related U.S. Application Data

[63] Continuation-in-part of Ser. No. 189,062, Sep. 22, 1980, abandoned.

[51] Int. Cl.³ ............... F25B 49/00; G05D 23/19
[52] U.S. Cl. .................... 62/228.3; 62/126; 62/157
[58] Field of Search ............ 62/125, 126, 127, 129, 62/157, 158, 231, 228.1, 228.3, 226, 227, 229

[56] References Cited

U.S. PATENT DOCUMENTS

3,312,081 4/1967 Berger et al. .................. 62/231 X
4,209,997 7/1980 Hodits, Jr. et al. ................ 62/226

FOREIGN PATENT DOCUMENTS

2543933 4/1977 Fed. Rep. of Germany ........ 62/125

OTHER PUBLICATIONS

1980 Oldsmobile Omega Service Manual, Section 1B, "Air Conditioning", published in 1979.

*Primary Examiner*—Harry B. Tanner
*Attorney, Agent, or Firm*—Mark A. Navarre

[57] ABSTRACT

A solid state circuit for cycling the refrigerant compressor of an automotive air conditioning system on and off in accordance with a refrigerant vapor condition and for detecting the duration of compressor energization periods as an indication of low refrigerant charge. If a condition of low refrigerant charge is detected, the compressor is disabled and an instrument panel lamp is lit to notify the operator of the vehicle of the low refrigerant charge condition.

2 Claims, 2 Drawing Figures

SOLID STATE CLUTCH CYCLER WITH CHARGE PROTECTION

This application is a Continuation-In-Part of U.S. Ser. No. 189,062, filed Sept. 22, 1980, now abandoned.

This invention relates to automotive air conditioning systems and more particularly to an electronic control system for providing low charge protection for the compressor of such a system.

Automotive air conditioning systems generally comprise a refrigerant compressor, a condenser for removing excess heat from high pressure refrigerant, an expansion orifice for rapidly changing the pressure and temperature of the refrigerant, an evaporator for heat transfer between the air conditioning system and the passenger compartment of the automobile, and an accumulator for separating the gaseous and liquid refrigerant at the outlet of the evaporator. A small amount of oil is suspended in the refrigerant for lubrication of the moving parts of the compressor. The refrigerant level or charge therefore determines the degree of compressor lubrication as well as the cooling performance of the system.

If a significant portion of the refrigerant escapes, compressor lubrication may be insufficient, and continued operation under such conditions could severely damage the compressor. Accordingly, it has been proposed in certain prior art systems to sense the level of refrigerant and to disable the compressor if the refrigerant level falls below a reference level. Such systems, however, are usually expensive to implement since they require the addition of a separate transducer for sensing the refrigerant level.

Accordingly, it is an object of this invention to provide an improved air conditioning system wherein the compressor is protected from damage due to operation under conditions of insufficient refrigerant without necessitating a separate transducer for sensing the refrigerant level.

It is a further object of this invention to provide an improved air conditioning system having a refrigerant compressor which is cycled on and off as a function of a refrigerant vapor condition, wherein the on-time of the compressor is sensed and compared to a reference short duration on-time to provide an indication of the refrigerant level in the system.

It is a further object of this invention to provide a system of the above type wherein the compressor is disabled following the occurrence of a number of consecutive compressor cycles having on-times less than the reference on-time, such occurrence being indicative of a predetermined probability that the amount of refrigerant is insufficient for continued safe operation of the compressor.

These objects are carried forward in the illustrated embodiment with a conventional automotive air conditioning system by cycling the compressor on and off as a function of the refrigerant vapor pressure in the accumulator and by comparing the compressor on-time in each cycle with a reference time duration. A pressure transducer located in the accumulator provides a signal proportional to the refrigerant vapor pressure therein and a solid state circuit compares the signal with upper and lower reference signals, and cycles the compressor on and off in a manner to maintain the accumulator refrigerant pressure between two reference levels. Alternatively, the compressor could be cycled on and off as a function of the refrigerant vapor temperature, the pressure-temperature relationship being a characteristic property of the refrigerant. Moreover, the refrigerant vapor condition may be sensed at any point in the system between the accumulator and the downstream side of the expansion orifice.

It has been found that when the compressor is cycled as a function of a refrigerant vapor condition as described above, the compressor on-time in each cycle is related to the amount of refrigerant in the system. More particularly, it has been found the on-time falls below a predetermined short duration when the amount of refrigerant is insufficient for continued safe operation of the compressor. This invention utilizes the above findings to provide a novel charge protection system wherein the compressor on-time is sensed as an indication of refrigerant level and wherein the compressor is disabled when the refrigerant level is insufficient for continued safe operation. Specifically, an electronic circuit responsive to compressor energization detects the occurrence of three or more consecutive compressor on-times shorter than a predetermined reference time duration. The number of consecutive short durations (three) and the reference time duration are determined such that the operation described above is indicative of a predetermined probability that the amount of refrigerant is insufficient for continued safe operation. When such condition is detected, the compressor is disabled and an instrument panel lamp is lit to inform the operator of the vehicle of the deficiency.

IN THE DRAWINGS

Figure 1:
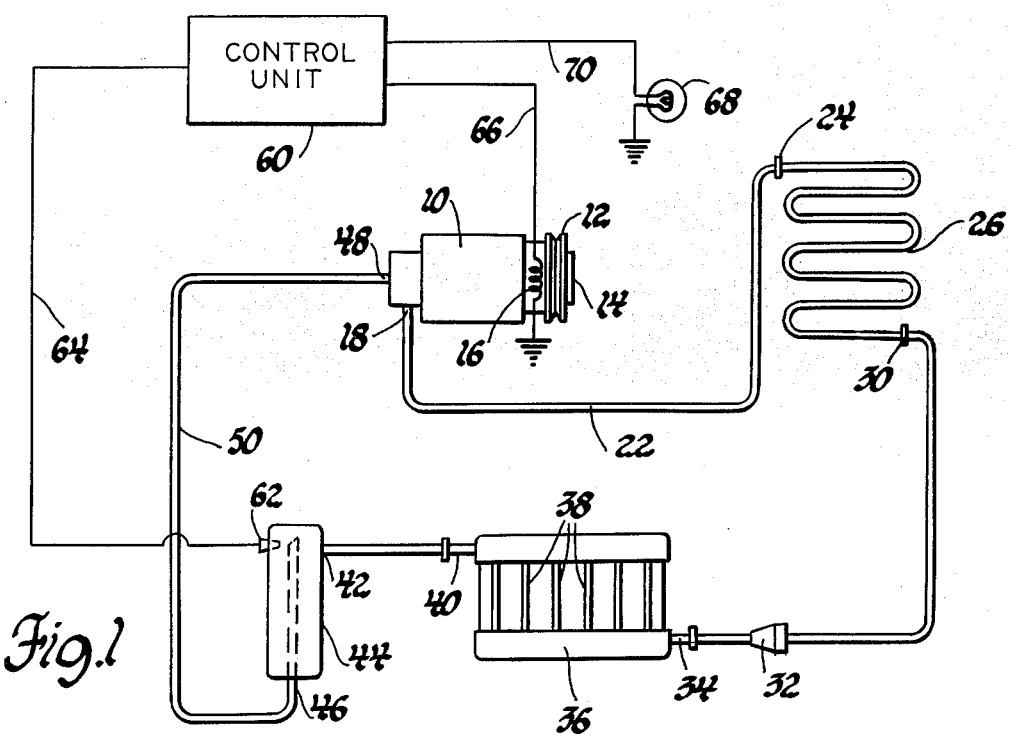
FIG. 1 is a schematic illustration showing an automotive air conditioning system and the control unit of this invention.

Referring now to FIG. 1, reference numeral 10 generally designates an air conditioning refrigerant compressor. Connected to the driveshaft (not shown) of compressor 10 is a pulley assembly 12 which is rotatably driven by the automotive engine with a V-belt (not shown). Compressor 10 further includes an electromagnetic clutch 14 and a clutch coil 16 selectively energizable to connect pulley assembly 12 in driving engagement with the compressor driveshaft. The outlet 18 of compressor 10 is attached to flexible hose 22 which is connected to the inlet 24 of condenser 26. Condenser 26 is typically located in a manner to be exposed to a flow of air for cooling and liquifying warm refrigerant discharged from compressor 10. Outlet 30 of condenser 26 is connected to an orifice tube-type expander 32 which rapidly decreases the pressure of the liquid refrigerant discharged from condenser 26 to effect rapid cooling of the refrigerant. A more detailed description of such an orifice tube expander is given in the U.S. Pat. No. 3,815,379 to Scherer. The outlet of orifice expander 32 is connected to the inlet 34 of evaporator 36. Liquid refrigerant in the evaporator is vaporized or "boiled" in vertical passages or tubes 38 each having fluid conveying portions and exterior finned surfaces formed thereon. The evaporator 36 has an outlet 40 which is connected to an inlet 42 of accumulator 44. The accumulator 44 separates the liquid and gaseous refrigerant, and discharges the gaseous refrigerant through an outlet 46 to inlet 48 of compressor 10 via suction line 50. A more detailed description of accumulator 44 is given in the U.S. Pat. No. 4,111,005 to Livesay.

Pressure-to-voltage transducer 62 is placed in accumulator 44 so as to be responsive to the refrigerant vapor pressure therein. The electrical signal output of transducer 62 is applied as an input to a control unit 60 via line 64. In response to pressure variations in accumulator 44, control unit 60 controls the energization of clutch coil 16 via line 66, and as will be later explained, is adapted to light instrument panel lamp 68 via line 70 if a low refrigerant charge condition occurs.

Figure 2:
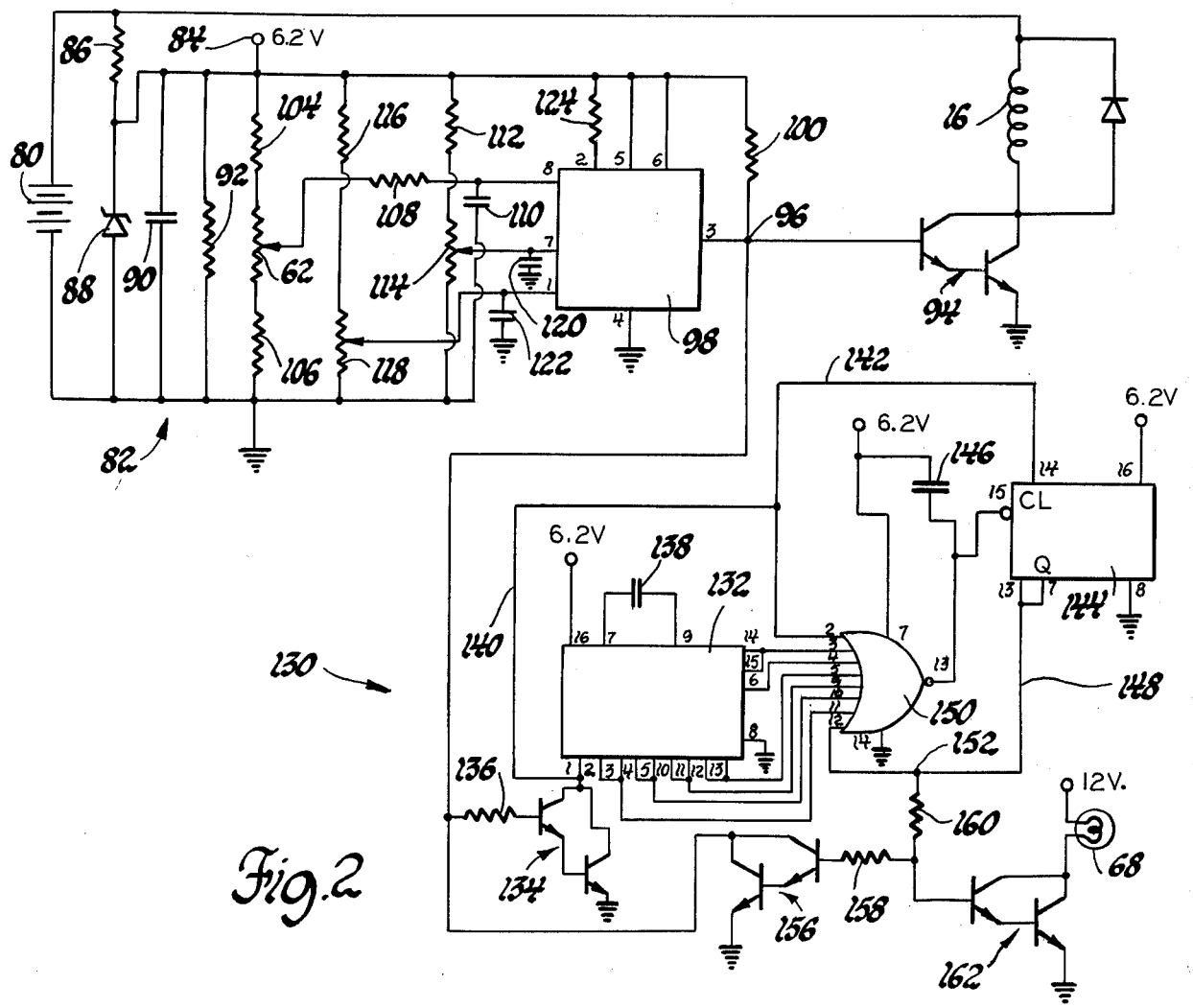
FIG. 2 is a circuit diagram of the control unit depicted in FIG. 1.

FIG. 2 is a circuit diagram of control unit 60 as well as the input and output devices depicted in FIG. 1. Corresponding circuit elements have been assigned the same reference numerals in both FIGS. 1 and 2.

Battery 80 supplies energization current at its terminal voltage for clutch coil 16 and instrument panel lamp 68, while a voltage regulator, designated generally by reference numeral 82, provides a second voltage potential at terminal 84 for supplying power to the devices internal to control unit 60. Specifically, voltage regulator 82 comprises a serially connected resistor 86 and Zener diode 88 connected in parallel across battery 80, and a filter network comprising capacitor 90 and resistor 92 connected in parallel with Zener diode 88. According to the preferred embodiment, battery 80 is a 12-volt automotive storage battery and the second regulated voltage provided at terminal 84 is approximately 6.2 volts.

The energization circuit for coil 16 includes automotive storage battery 80 and Darlington transistor 94. Transistor 94 is selectively biased to its conductive and nonconductive states according to the voltage level at terminal 96, which under normal conditions, is determined in accordance with the output condition of integrated circuit 98. Circuit 98 is a CA3098 Programmable Schmitt Trigger, manufactured by RCA Corporation, Somerville, N.J. Circuit 98 comprises a pair of differential amplifiers adapted to compare an input signal (applied to pin 8) to an upper reference voltage (applied to pin 7) and a lower reference voltage (applied to pin 1). The differential amplifier outputs are summed to control the state of a flip-flop, the output of which is applied to a driver circuit for sinking externally provided load current at pin 3. The external biasing current for transistor 94 is provided by resistor 100, which is connected between terminals 84 and 96. When the input signal voltage applied to pin 8 equals or exceeds the upper reference voltage, output pin 3 of circuit 98 is a logic 1, and the current provided through resistor 100 biases transistor 94 to a conductive state to energize coil 16. When the input signal voltage is less than or equal to the lower reference voltage, pin 3 of circuit 98 is a logic 0, and circuit 98 sinks the externally provided biasing current to bias transistor 94 to a nonconductive state to deenergize coil 16.

Pressure-to-voltage transducer 62 along with resistors 104 and 106 provide an input signal to pin 8 of circuit 98 through an input filter network comprising resistor 108 and capacitor 110. Transducer 62 may be an off-the-shelf device such as the model BP 2101 Pressure Transducer, manufactured by Besco Industries, Inc., Chatsworth, Calif., the output voltage of which varies as a function of the pressure which it senses.

Resistors 112 and 114 form a voltage divider for generating the upper reference voltage level for pin 7, and resistors 116 and 118 form a second voltage divider for providing the lower reference voltage for pin 1. Resistors 114 and 118 are potentiometers so that the reference voltages may be adjusted to the desired values. Capacitors 120 and 122 operate in a well-known manner to filter transient voltages at pins 7 and 1, respectively. The power and control connections for circuit 98 are made at pins 2 (via resistor 124), 4, 5 and 6 as shown.

The operation of the above-described portion of control unit 60 may now be described in some detail. The signal voltage from transducer 62 is applied to pin 8 of circuit 98 and varies in accordance with the gaseous refrigerant pressure in air conditioning accumulator 44. The upper and lower reference voltage levels applied to pins 7 and 1 of circuit 98 are chosen so that the compressor coil 16 is deenergized when the accumulator refrigerant pressure drops below 27 PSI and is energized when the accumulator refrigerant pressure rises above 45 PSI. It will be understood that in this way, refrigerant compressor 10 is cycled on and off in a manner to maintain the cooling capacity of the air conditioning system between two limit values. It will, of course, be appreciated that integrated circuit 98 may be replaced with discrete operational amplifiers and a flipflop if so desired but that an integrated circuit such as the one specified constitutes the preferred embodiment.

Also connected to terminal 96 for influencing the energization of compressor coil 16 is a refrigerant charge protection circuit, designated generally by reference numeral 130. As will be described, circuit 130 detects the energization duration or on-time of compressor coil 16 in order to determine if the amount of refrigerant is insufficient for continued safe operation. As noted above, the operation of this invention is premised upon the relation between the compressor on-time and the refrigerant charge level in a system in which the compressor is cycled on and off according to a condition (temperature or pressure) of the refrigerant in the vicinity of the evaporator. In refrigeration, the term "quality" is used to denote the mass proportion of vapor in a mixture of liquid and vaporous refrigerant. In an air conditioning system, the quality of the refrigerant supplied to the evaporator by the compressor is determined by the refrigerant charge level in the system. When the refrigerant charge is at a normal level, the refrigerant supplied to the evaporator inlet 34 is predominantly liquid. The liquid refrigerant is vaporized due to heat exchange between the evaporator 36 and the passenger compartment, and compressor 10 draws the refrigerant vapor out of the evaporator outlet 40. Under such conditions, a typical compressor on-time would be approximately 15 seconds for the pressure limits given, depending on the cooling load. When the refrigerant charge is at an abnormally low level, however, the refrigerant supplied to the evaporator inlet 34 is predominantly vaporous. Since there is little or no liquid refrigerant in the evaporator 36 under such condition, compressor 10 quickly reduces the pressure of the refrigerant vapor in the evaporator 36 and accumulator 44 to the lower reference level of the compressor cycling circuitry, thereby resulting in an abnormally short compressor on-time. In such case, a typical compressor on-time would be approximately 1-2 seconds for the pressure limits given. However, one such short on-time may occur with a normal refrigerant level under certain operating conditions, such as a full throttle acceleration following a prolonged period of idling. Accordingly, circuit 130 is designed to detect the occurrence of three or more consecutive brief energization periods. When such occurrence is detected, there is a high probability that the amount of refrigerant is insufficient for continued safe operation of the compressor. At such time, terminal 96 is lowered to ground potential to disable further energization of the compressor coil 16, and instrument panel lamp 68 is energized to notify the operator of the vehicle of the low refrigernat condition.

Referring now more specifically to the components of circuit 130, integrated circuit 132 is a MC 14490 Hex Contact Bounce Eliminator, manufactured by Motorola Semiconductor Products, Inc., Phoenix, Ariz. Circuit 132 contains six identical contact bounce eliminators for receiving an input signal subject to contact bounce and for reproducing the input signal at an output terminal four clock periods after the input signal has stabilized. The duration of the clock periods is determined by the value of capacitor 138, which is connected between pins 7 and 9 of the circuit. The voltage at terminal 96 is applied to the base or control input of Darlington transistor 134 through input resistor 136, the emitter-collector circuit of transistor 134 being connected between ground potential and input pin 1 of circuit 132. Accordingly, a digital signal is provided at input pin 1 of circuit 132, the logic level of which is low when compressor coil 16 is energized and high when compressor coil 16 is deenergized. In this application, circuit 132 is used merely as a delay line for the input signal since the input signal is from a semiconductor switch and is not subject to contact bounce. The duration of delay between the input and output of circuit 132 is determined as a fucntion of the value of capacitor 138. The six contact bounce or delay circuits of circuit 132 are serially connected as shown so that there is one delay period between pin 1 and pin 15, and six delay periods between pin 1 and pin 6. According to the preferred embodiment, capacitor 138 is 0.33 uF so that the delay between pins 1 and 15 is approximately 0.42 seconds and the delay between pins 1 and 6 is approximately 2.5 seconds. The power and ground connections for circuit 132 are made at pins 16 and 8 as shown. It will be recognized that the function of circuit 132 may be performed with a variety of other circuits including discrete solid state devices, but that an integrated circuit such as the one specified constitutes the preferred embodiment of this invention.

The input signal applied to pin 1 of delay circuit 132 is also connected via lines 140 and 142 to the clock input (pin 14) of counter circuit 144. Counter 144 may be a conventional semiconductor counter circuit but is preferably a CD 4022 Divide-by-Eight Counter/Divider, manufactured by RCA Corporation, Somerville, N.J. Each time compressor coil 16 is deenergized, the signal on line 142 changes from a logic 0 to a logic 1 to increment the output register of counter circuit 144. The output register of counter 144 may be reset by applying a logic 1 voltage level to pin 15. Capacitor 146 is connected between the 6.2 volt source at terminal 84 and reset pin 15 of counter 144 so that the output register of counter 144 is reset each time power is initially applied to the control system. Pin 7 of counter 144 is the third bit of the output register. Accordingly, it will assume a logic 1 voltage level if compressor coil 16 is deenergized three times in succession without the application of a reset signal to pin 15. Pin 13 disables the clock input of counter 144 when held at a logic 1 voltage level so that once the output register of counter 144 has been incremented three successive times, that count is latched into the output register to hold the voltage at terminal 152 at a logic 1 level. The power and ground connections for circuit 144 are made at pins 8 and 16 as shown.

NOR gate 150 is an 8-input device and may be the RCA integrated circuit CD 4078. The output of each debouncing circuit of circuit 132 (pins 15, 3, 5, 6, 11 and 13) is connected as an input to NOR gate 150. Also connected as inputs to NOR gate 150 are the signals at pin 1 of circuit 132 and pin 7 of counter circuit 144. The power and ground connections for NOR gate 150 are made at pins 7 and 14 as shown. The output of NOR gate 150 (pin 13) is connected to the reset input (pin 15) of counter 144. It will be appreciated that with the circuit connections shown, the output of NOR gate 150 may assume a logic 1 voltage level to reset the output register of counter 144 only if (1) the energization period of compressor coil 16 is longer than 2.5 seconds, and (2) output pin 7 of counter 144 is at a logic 0 voltage level. As indicated above, the 2.5 second limit corresponds to the long delay period between pin 1 and pin 6 of circuit 132. Accordingly, the output register of counter 144 will be reset by NOR gate 150 each time there is a compressor coil energization period longer than 2.5 seconds, providing that three successive energization periods of less than 2.5 seconds have not been counted.

In view of the foregoing, it should be apparent that terminal 152 (which is connected to output pin 7 of counter 144) is normally at a logic 0 voltage level but changes to a logic 1 voltage level if compressor coil 16 is energized three times in a row for less than 2.5 seconds. The above condition represents a predetermined probability that the amount of refrigerant in the air conditioning system is insufficient to provide adequate lubrication for compressor 10. When terminal 152 is raised to a logic 1 voltage level, Darlington transistor 156 is biased to a conductive state through input resistors 158 and 160, and Darlington transistor 162 is biased to a conductive state through input resistor 160. Transistor 156 pulls the voltage level at terminal 96 to nearly ground potential, thereby sinking the bias current for transistor 94 to disable further energization of compressor coil 16. When transistor 162 is biased to a conductive state, instrument panel lamp 68 is lit to inform the driver of the vehicle that the air conditioning system is being disabled due to low refrigerant charge. The entire circuit is reset each time power is applied to the system—that is, each time the electrical system of the motor vehicle is energized.

The operation of the compressor cycling and charge protection circuits of this invention will now be described. When the air conditioning system of the motor vehicle is engaged, compressor coil 16 is cycled on and off in accordance with the gaseous refrigerant pressure in accumulator 44 as detected by transducer 62. Coil 16 is energized when the accumulator pressure equals or exceeds the upper reference level set by potentiometer 114 and is deenergized when the accumulator pressure is less than or equal to the lower reference pressure set by potentiometer 118. In this manner, compressor 10 is cycled on and off to maintain the cooling capacity of the air conditioning system at a desired level. Normally, coil energization periods are approximately 15 seconds in duration. Under such conditions, delay circuit 132 and NOR gate 150 continually reset the output register of counter 144 so that terminal 152 remains at a logic 0 voltage level. As described above, however, a single short compressor coil energization period may occur under certain normal operating conditions. In such case, the short energization period would increment the output register of counter 144 once, and subsequent longer energization periods would reset the output register of counter 144 as described above. If a system leak results in a significant loss of refrigerant, the compressor energization periods become very brief in duration (less than 2.5 seconds), and the output register of counter 144 is successively incremented by the clock signal on line 142. If no energization period is longer than 2.5 seconds, NOR gate 150 cannot reset the output register of counter 144, and after three successive short duration compressor energization periods, the third bit (pin 7) of counter 144 changes the voltage potential at terminal 152 to a logic 1 voltage level. As a result, transistors 156 and 162 are biased conductive to disable compressor coil 16 and to light instrument panel lamp 68 to warn the operator of the vehicle. At this point, the high logic voltage level at terminal 152 holds the output of NOR gate 150 low and disables the clock input (pin 14) of counter 144. As a result, compressor clutch 14 is disabled until the circuit power supply is interrupted.

It will now be appreciated that charge protection circuit 130 will operate equally as well if reference pressure circuit 98 and transistor 94 are replaced with a mechanical pressure switch placed in communication with the refrigerant vapor pressure in accumulator 44. If such a circuit modification is desired, contact bounce eliminator circuit 132 will conveniently function as a debouncing circuit for the pressure switch contacts.

It will also be recognized that the system of this invention may be used to provide a low charge warning to the operator of the vehicle when the refrigerant level is lower than normal but not so low as to cause three or more consecutive short duration compressor on-times. In such case, the warning lamp 68 may be operated in response to the second bit of counter 144 so that the lamp 68 is lit if two consecutive short duration energization periods occur. In certain situations, as for example, where the refrigerant level is gradually reduced due to a system leak, the warning lamp 68 would light prior to the disabling of the compressor 10, thereby providing an early warning of the deficiency.

Although the compressor 10 is disabled following three short energization periods according to the illustrated embodiment, it should be recognized that, depending upon the parameters of a given application, it may be desired to detect a greater or lesser number of short energization periods prior to disabling compressor 10. The most important considerations, of course, are (1) that the compressor 10 be disabled prior to the occurrence of any damage, and (2) that the compressor 10 not be disabled if the air conditioning system is operating normally.

As indicated earlier, this invention broadly relates to a system wherein the compressor 10 is cycled on and off as a function of a refrigerant vapor condition, and that according to the preferred embodiment, the vapor condition is pressure. It is noted, however, that under most operating conditions, the invention is also applicable to a system wherein the compressor 10 is cycled as a function of the refrigerant vapor temperature. In such case, the temperature reading is considered as an indirect measurement of the pressure, the pressure-temperature relationship being a characteristic property of the refrigerant. Under certain operating conditions when the refrigerant level is extremely low, abnormally brief energization periods do not occur in a temperature cycled system, and a circuit according to this invention is ineffective to sense the refrigerant deficiency. In order to protect the compressor 10 under such conditions, a low pressure switch (not shown) should be provided in the compressor suction line 50 for disengaging the compressor clutch 14 when the pressure therein falls below a reference value.

The charge protection circuit 130 illustrated herein will also protect the compressor 10 from damage when there is a refrigerant flow restriction. If contaminants are released in the air conditioning system and congregate so as to restrict the flow of refrigerant through the system, the pressure in accumulator 44 will exhibit the same behavior as when there is a low refrigerant charge condition. In such a case, the illustrated charge protection system would, after sensing three consecutive coil energization periods shorter than 2.5 seconds in duration, disable compressor clutch 14 and light instrument panel lamp 68 to notify the operator of the vehicle of the deficiency. As indicated, the operation described above applies only to a system cycled as a function of refrigerant vapor pressure, and not to a system cycled as a function of refrigerant vapor temperature. In a temperature-cycled system, the low pressure switch (not shown) referred to above operates to disable the compressor clutch 14 when there is a flow restriction.

In the course of the development of this invention, it has been found that measuring the compressor cycle-rate (in lieu of measuring the compressor on-time) may also provide an indication of low refrigerant charge, due to the relationship between abnormally short duration on-times and abnormally high cycle-rates. It will be appreciated by those skilled in the art that a charge protection system based on cycle rate detection might be implemented, for example, with a frequency comparator for comparing the compressor cycle-rate to a reference frequency representing a predetermined probability of low refrigerant charge. However, measuring cycle rate is considered to be an inferior method of protection because the compressor off-time tends to vary as a function of the ambient temperature. The cycle-rate method of detection thus provides less precise protection in a thermally variant environment, such as that which a motor vehicle is typically operated in. Notwithstanding the above, it is recognized that a low charge protection system based on compressor cycle-rate detection may be desirable, depending on the given system constraints.

It will be understood that this invention is described herein with respect to the illustrated embodiment, that further modification may occur to those skilled in the art, and that such modification may fall within the scope of this invention, which is set forth in the appended claims.

The embodiments of the invention in which an exclusive property or privilege is claimed are defined as follows:

1. In an automotive air conditioning system including an evaporator in which liquid refrigerant is vaporized in effecting heat exchange with a compartment to be cooled, means including a compressor for drawing refrigerant vapor from the evaporator outlet and for supplying refrigerant to the evaporator inlet, the quality of the supplied refrigerant being related to the refrigerant charge level in the system such that the supplied refrigerant is predominantly liquid when the refrigerant charge is at a normal level and predominantly vapor when the refrigerant charge is at an abnormally low level which is insufficient to provide adequate compressor lubrication, and means including a transducer for cycling the compressor on and off according to the pressure of the refrigerant vapor between the evaporator outlet and the compressor such that the compressor is cycled on when such pressure rises above an upper reference value due to vaporization to refrigerant in the evaporator and the compressor is cycled off when such pressure decreases below a lower reference value due to the drawing action of said compressor, the improvement comprising:

sensing means for monitoring the compressor on-time and for signalling the occurrence of an on-time at least as short as a reference on-time which corresponds to system operation wherein the refrigerant supplied to said evaporator is predominantly vapor and wherein the compressor thereby rapidly reduces the pressure of the refrigerant vapor to the lower reference value, whereby said sensing means is effective to detect operation of the compressor with an insufficient refrigerant charge level in said system without necessitating a further transducer for sensing the refrigerant charge level; and means for counting the number of consecutive cycles for which said sensing means signals the occurrence of an on-time at least as short as said reference on-time and for disabling the compressor when the count reaches a number indicative of a predetermined probability that the amount of refrigerant is insufficient for continued safe operation.

2. In an automotive refrigerant air conditioning system including a transducer responsive to the refrigerant vapor pressure in the system and a compressor which is cycled on and off as a function of such pressure, apparatus for protecting the compressor from damage due to continued operation with insufficient refrigerant without necessitating a further transducer for sensing the amount of refrigerant, the apparatus comprising;

means responsive to the cycling of said compressor effective to generate a reset signal when said compressor is cycled on for a time period greater than a reference time period and for generating a clock signal when said compressor is cycled on for a time period less than said reference time period, said reference time period corresponding to an abnormally short compressor on-time associated with a low refrigerant level in said air conditioning system;

means for incrementing a stored count in response to the generation of a clock signal and for resetting the stored count to zero in response to the generation of a reset signal;

means for generating a disable signal when said stored count exceeds a reference count indicative of a predetermined probability that the amount of refrigerant in said system is insufficient for continued safe operation of said compressor; and means for disabling said compressor in response to the generation of said disable signal.

* * * * *